A. W. BROWNE & F. L. WALLACE.
SURGICAL INHALER.
APPLICATION FILED FEB. 8, 1913.
1,109,318.
Patented Sept. 1, 1914.
3 SHEETS—SHEET 1.
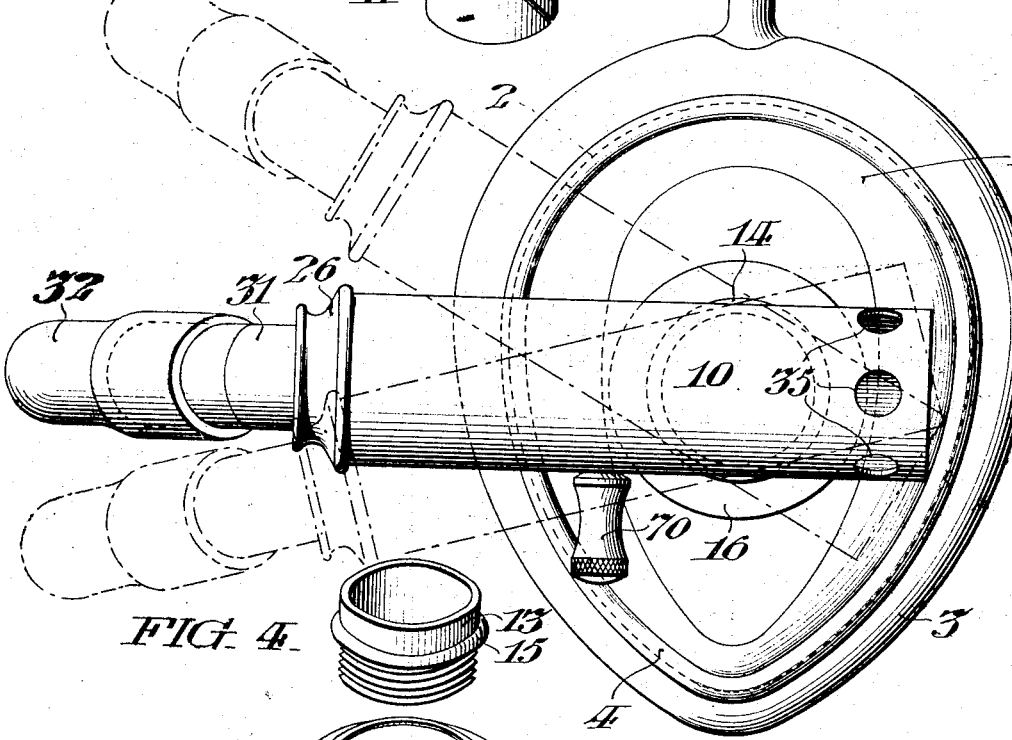

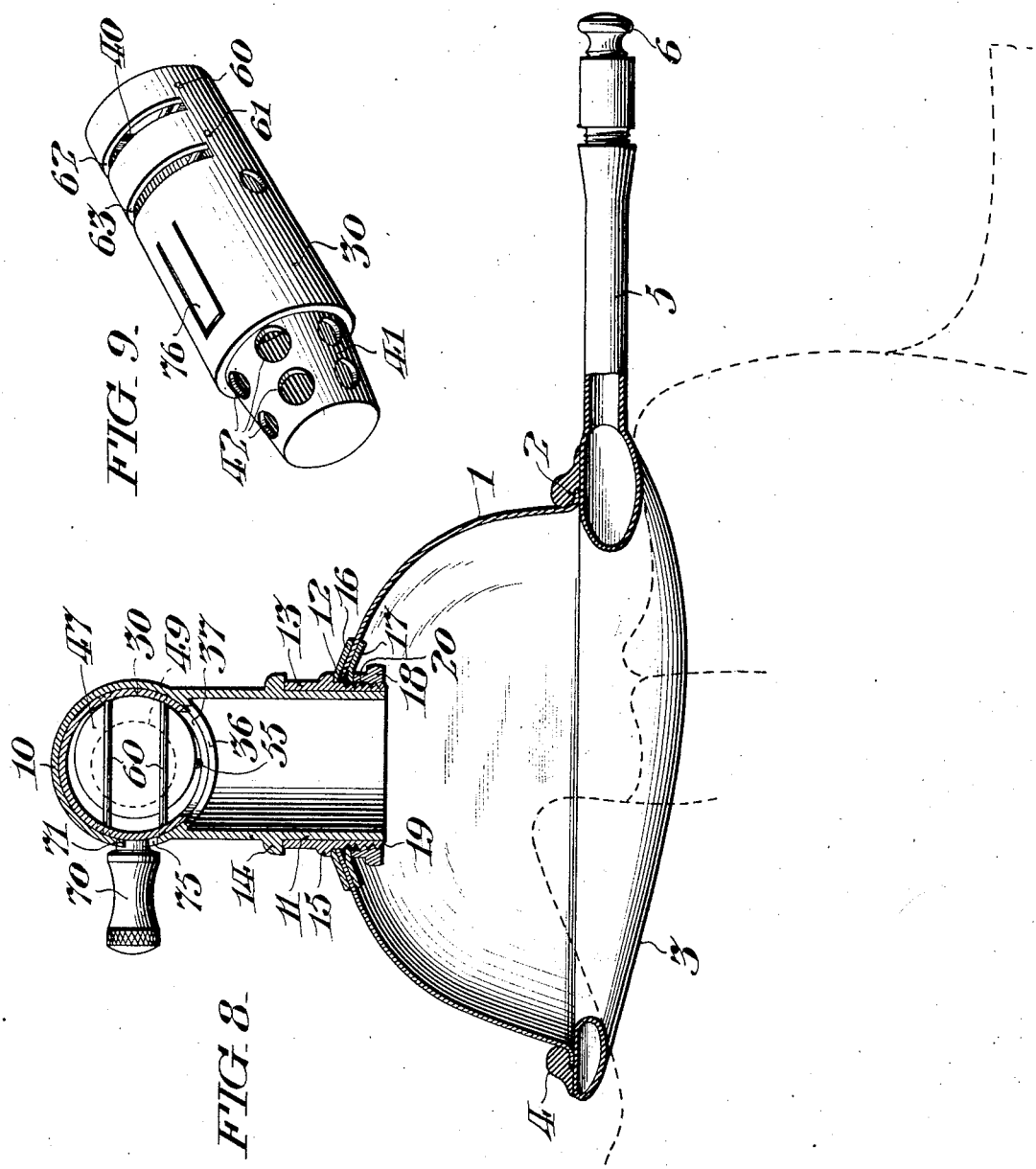

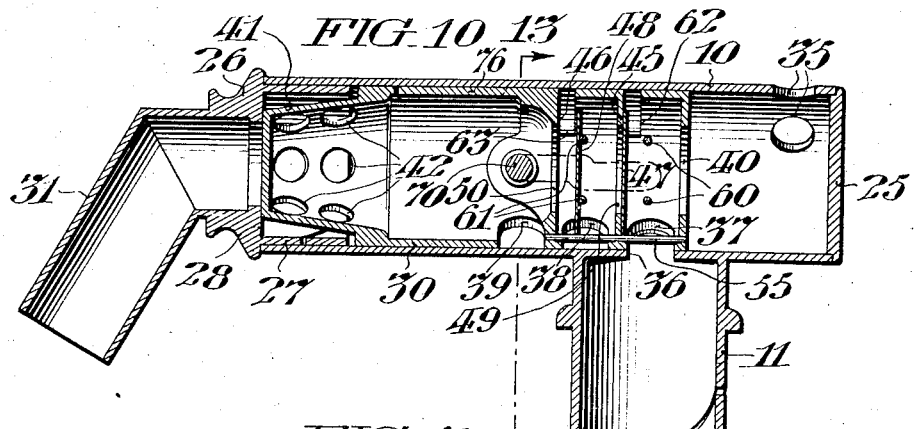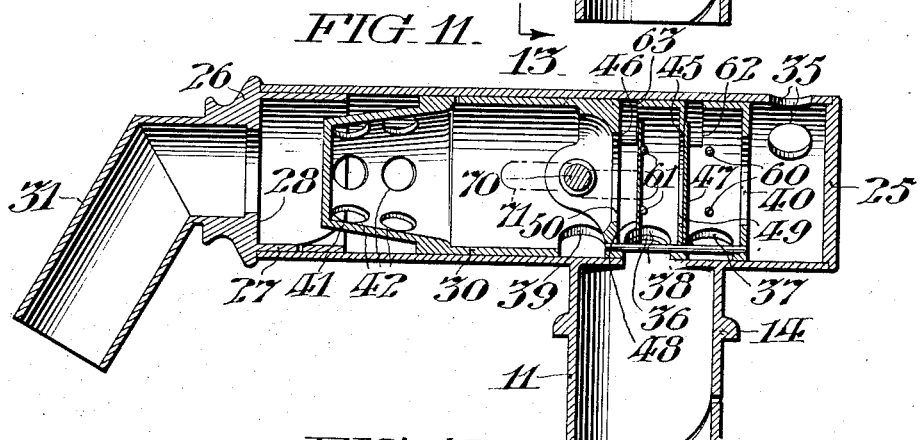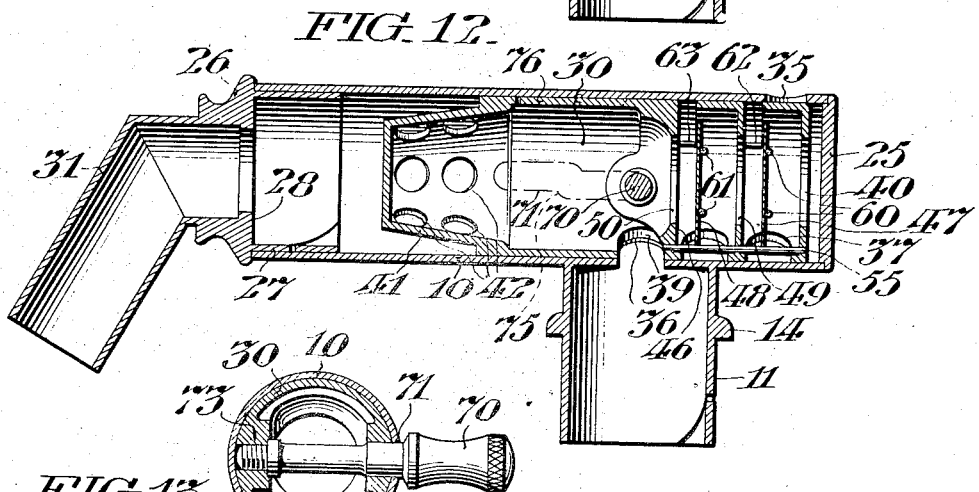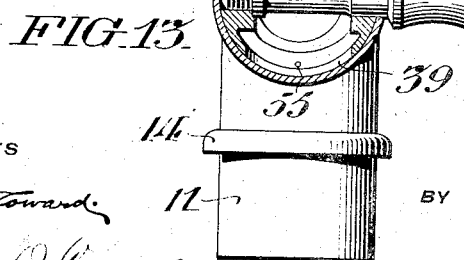

UNITED STATES PATENT OFFICE.

ARTHUR W. BROWNE, OF PRINCE BAY, NEW YORK, AND FREDERICK L. WALLACE, OF LANSDOWNE, PENNSYLVANIA, ASSIGNORS TO THE S. S. WHITE DENTAL MANUFACTURING COMPANY, OF PHILADELPHIA, PENNSYLVANIA, A CORPORATION OF PENNSYLVANIA.

SURGICAL INHALER.

1,109,318.  Specification of Letters Patent.  Patented Sept. 1, 1914.

Application filed February 8, 1913. Serial No. 747,016.

*To all whom it may concern:*

Be it known that we, ARTHUR W. BROWNE and FREDERICK L. WALLACE, citizens of the United States, residing, respectively, in Prince Bay, county of Richmond, State of New York, and Lansdowne, county of Delaware, State of Pennsylvania, have invented certain new and useful Improvements in Surgical Inhalers, of which the following is a specification, reference being had to the accompanying drawings.

Our invention relates to improvements in surgical inhalers and it has for its object broadly to provide an improved construction of means to regulate and control the administration of anesthetics or a mixture of the same with air to a patient for the purpose of producing anesthesia.

One of the objects of our invention is to provide means as a part of the inhaler construction in which, when the valve mechanism is adjusted so as to cause a patient to breathe to and fro to the air, the passageway for the anesthetic from its source of supply to the inhaler is automatically closed.

A further object of our invention is to provide means whereby the person administering the anesthetic may know the position of the valve with relation to the opening in the valve casing without the necessity of watching the same.

Our invention comprehends other objects and purposes which will be referred to and pointed out in the detailed description of the same or will be apparent from such description.

One form of a convenient embodiment of our invention is illustrated in the accompanying drawings, but it will be understood that changes in the details of construction may be made within the scope of the claims without departing from the same.

In the accompanying drawings, Figure 1 is a top plan view of a surgical inhaler constructed in accordance with our invention; Fig. 2 is a perspective view of the valve casing of our inhaler, showing the means for moving the valve within the casing and also showing a projecting nipple by means of which the same is connected to the face piece of the inhaler; Fig. 3 is a perspective view of a member adapted to be connected detachably to one end of the valve casing and which is provided with a nipple; Figs. 4, 5, 6 and 7 are perspective views showing in detail the devices employed for connecting the face piece to the nipple projecting from the valve casing; Fig. 8 is a sectional view on the line 8—8 of Fig. 1; Fig. 9 is a perspective view of the valve which operates in the valve casing; Fig. 10 is a central longitudinal sectional view of the valve casing and assembled parts, including the valve which is shown at its extreme left hand position; Fig. 11 is a similar view of the valve casing and assembled parts, the valve being shown in an intermediate position; Fig. 12 is also a similar view of the valve casing and assembled parts, the valve being shown at its extreme right hand position; and Fig. 13 is a transverse sectional view of the valve casing and the valve therein taken on the line 13—13 of Fig. 10.

In said drawings, the face piece 1, which is preferably transparent and consists of any suitable material, preferably glass or celluloid, is provided with a peripheral laterally extending flange 2, for the convenient engagement of the inflatable pneumatic pad 3 having a bead 4 secured upon its upper side, between which and the upper side of the pneumatic pad 3 a groove is formed into which the flange 2 projects, the said pad being thereby secured upon the lower edge of the face piece 1, to form the inhaling mask.

The pad 3 is provided with a tube 5 having a mouth piece 6 by means of which air may be blown into the said pad for the purpose of inflating the same. When the face piece is in position over the nose and the mouth of the patient, the pad fits closely against the face surrounding these organs and prevents the accidental entry of the surrounding air into said face piece. The valve casing 10 is provided intermediate its ends with a tubular nipple 11 which is adapted to project through an opening 12 in the upper side of the face piece 1, to provide means for securing the latter to the said valve casing.

In connecting the face piece to the nipple we employ a sleeve 13 which is fitted over the lower end of the nipple 11, its upper end being seated against the lower side of a flange 14 upon the said nipple. The sleeve 13 is provided with a flange 15 against which an annular washer-like member 16 is seated, which member is of truncated cone shape and is located upon the outside of and in contact with the face piece 1, a similar member 17 being located upon the inside of the face piece 1 in opposite relation to the member 16. The face piece 1 and the members 16 and 17 are held in position upon the sleeve 13 as illustrated in Fig. 8 by means of a threaded nut 18 in engagement with the lower threaded end of the sleeve 13. The said sleeve 13 snugly fits the lower end of the nipple 11 and may be rotated thereon so as to vary the positions of the valve casing and the face piece with relation to each other as may be desired or necessary and as indicated by dash and dot lines in Fig. 1. The face piece and the valve casing may also be adjusted with respect to each other by loosening the nut 18 and turning the face piece or the valve casing without disturbing the sleeve 13.

In order that the nut 18 may be readily engaged with the screw-threads upon the end of the sleeve 13 which projects through the opening 12 in the face piece 1, we have beveled the end of the said sleeve as shown at 19 in Fig. 8 and have also omitted the screw threads from the upper end of said nut as indicated at 20, see Fig. 7. The presence of such bevel and the omission of the screw threads cause the nut to be accurately positioned and facilitate the connection of the same.

As already indicated, the sleeve 13 may be removed readily from the lower end of the tubular nipple 11 and by removing the nut 18 from the said sleeve 13 the face piece and the rings 16 and 17 may be readily separated so that the several parts may be thoroughly cleansed, the parts 13, 16, 17, and 18 being placed, for instance, in boiling water, and the face piece 1 also, provided it should consist of material not injuriously affected by hot water. If, however, the face piece should consist of a material which may not be subjected to the action of boiling water without injury, it may be otherwise cleansed, as by the use of an antiseptic wash, as may the pneumatic pad 3.

One end of the valve casing is closed as indicated at 25, while at the opposite end we have provided a member 26 having a relatively long tubular flange 27 which is adapted to fit snugly, but movably inside of the casing 10. The said member 26 is provided with a shoulder 28 which constitutes a seat for one end of the tubular slide valve 30. The said member 26 is provided with an angular nipple 31 to which one end of a tube 32 may be connected for conducting an anesthetic from any suitable source of supply to the inhaler.

The valve casing 10 is provided with openings or ports 35 through which air may enter to be breathed by the patient and through which the gases exhaled by the patient may escape from the valve casing. The valve casing is also provided with an opening or port 36 within the region surrounded by the nipple 11. The tubular slide valve 30 is provided with three openings or ports 37, 38 and 39 which respectively may be made to register or aline with the opening 36 in the side of the valve casing, by moving the said valve. One end of the slide valve is provided with an opening 40 through which the air from the openings 35 may pass and through which the exhaled gases may pass outwardly. The opposite end of the slide valve 30 is provided with a reduced truncated cone-shaped extension 41 provided with two circular rows of openings 42 through which the anesthetic which may be supplied to the patient passes.

Located intermediate the opposite ends of the slide valve 30 are the internal flanges 45 and 46, constituting valve seats, against which reciprocatory check valves 47 and 48, consisting of flat plates, are adapted to be seated to close the openings 49 and 50 through the said flanges. The said flanges 45 and 46 are located adjacent to the openings 37 and 38 and the valves 47 and 48 respectively coöperating with said flanges 45 and 46 regulate and control the passage of anesthetic, air and gases through said openings. The reciprocating valves 47 and 48 are supported at their lower edges upon a small rod 55 and their movements away from the said seats 45 and 46 are limited by the rods 60 and 61 extending cross-wise of and supported upon the slide valve 30. For the purpose of introducing the reciprocatory valves 47 and 48 into the tubular slide valve 30 we provide the slots 62 and 63.

As a means for moving the slide valve 30 longitudinally in the valve casing 10 we provide a finger piece 70 which extends through a slot 71 formed in one side of the valve casing 10 and which also extends through the valve 30, and has the screw threaded connection with a thickened portion of said valve as indicated at 73 in Fig. 13 of the drawings. The portion of the slot 71 on one side of its center is out of alinement with the portion thereof on the opposite side of such center so that the said slot is not straight. As a result the shoulders 74 and 75 are formed on the upper and lower edges of the said slot, which shoulders have substantially parallel inclined surfaces.

When it is desired to move the valve 30 longitudinally in the valve casing 10 the anesthetist takes hold of the finger piece 70 and moves the said valve toward the right or to the left as may be desired. When the said valve 30 is moved from the position shown in Figs. 2 and 10 toward the right the finger piece 70 strikes the shoulder 74 and in order to continue the movement the said finger piece must be moved downwardly between the shoulders 74 and 75. When the valve is moved in the opposite direction, from the position in which it is shown in Fig. 12, the said finger piece strikes the shoulder 75. These shoulders are so positioned that when the finger piece 70 is in contact with either of them the opening 38 in the valve 30 is in alinement with the opening 36 in the valve casing. The finger piece 70 and the slot 71 are so related to each other and to the opening 36 in the valve casing 10 and the openings 37, 38 and 39 in the valve 30 that when the said finger piece occupies a position at the extreme right hand end of the slot the opening 39 is in alinement or registry with the opening 36. If, however, said finger piece occupies a position at the opposite end of the said slot the opening 37 is in alinement or registry with said opening 36. The valve 30 is provided with an integral spring finger 76 which exerts sufficient pressure against the inside of the valve casing 10 to prevent accidental movement or displacement of the said valve but not sufficient to prevent movement, when desired, of the valve in the valve casing.

In the construction of valve mechanism as illustrated the person administering the anesthetic may so position the same as to cause the patient to breathe air only, which position of the valve is illustrated in Fig. 10. If it be desired to cause the patient to inhale the anesthetic and exhale to the open air the valve 30 is moved to its intermediate position as illustrated in Fig. 11 with the finger piece 70 in contact with the shoulder 74. In such position it will be observed that the left hand end of the valve 30 has been moved to the right, away from its seat 28; so that the anesthetic may enter the valve chamber through the openings 42 and that the reciprocatory valve 48 is separated from its seat so that the anesthetic may pass through the opening 50 and thence to and through the opening 36 in the valve casing and on to the chamber of the face piece 1, there to be delivered to the patient. When the patient exhales, however, the valve 48 moves to the left against its seat 46 closing the opening 50 and causing the exhaled gases to travel to the right through the openings 49, 40 and 35 to the open air.

When the valve 30 is in the position illustrated in Fig. 10 the patient inhales and exhales through the air ports 35, and it is in this position of the valve that the inhaling mask is introduced to the patients face. The second position of the valve 30 as illustrated in Fig. 11 affords inhalation from the source of anesthetic and exhalation through the air ports 35, the valve in this position tends to expel the air from the patient together with the anesthetic inhaled, as a result anesthesia may be produced. In the third position of the valve 30 as illustrated in Fig. 12, the patient inhales from and exhales into the anesthetic container and by reason of such action a more prolonged and profound anesthesia may be rapidly and easily established.

Having thus described our invention, we claim:—

1. A surgical inhaler having means of connection with a face piece, and comprising a valve casing having an opening through which anesthetics and gases may pass to and from the face piece, a slide valve having a plurality of openings, any one of which may be moved into alinement with the opening in the valve casing, and means for indicating which of the said openings in the said valve is in alinement with the opening in the valve casing, and for registering the intermediate, as well as the end, openings in the valve with the opening in the valve casing.

2. A surgical inhaler comprising a tubular valve casing having an opening therein and also having a passage way leading to a source of anesthetic, a tubular slide valve situated in the said casing one end of which is adapted to close the said passage way and the said valve having an opening through which an anesthetic may pass from the said passage way and also having a plurality of openings which may be moved into alinement with the opening in the said valve casing by movement of the said valve, and reciprocatory valves in the said slide valve for controlling the passage of gases through the opening in said valve casing.

3. A surgical inhaler comprising a tubular valve casing having an opening in one side thereof, one end of the said casing being closed by a detachable member having an opening in communication with a source of anesthetic, the said opening being surrounded by a valve seat, a tubular slide valve situated in the said tubular casing one end of which is adapted to close the opening through the said member when in one position and the said valve being provided with an opening through which an anesthetic may enter the chamber in the same and being also provided with a plurality of openings, any one of which may be moved into alinement with the opening in the side of the said valve casing by movement of the said valve, and valves situated in the said slide valve for controlling the passage of gases through the opening in the side of the said valve casing.

4. A surgical inhaler comprising a tubular valve casing having an opening in one side thereof, the said valve casing being arranged for connection with a source of anesthetic or the like, a tubular slide valve situated in the said casing, adapted to close the communication between the said valve casing and the connection with said source of anesthetic, said valve being provided with a plurality of openings any one of which is adapted to be carried into alinement with the opening in the side of the valve casing by movement of the said valve, and check valves situated in the said slide valve and being associated with certain of the openings therein to control the passage of the anesthetic and gases therethrough and through the said valve casing.

5. A surgical inhaler comprising a valve casing, having an opening intermediate its ends for communication with a face piece and also having an opening to the open air adjacent to one of its ends, the opposite end of the said valve casing being arranged for connection with a source of anesthetic or the like, a tubular slide valve situated in the said valve casing and having one of its ends closed for the purpose stated and having openings adjacent to said closed end to permit the passage of an anesthetic or the like thereinto and also having a plurality of openings any one of which is adapted to be carried into alinement with the opening in the side of the said valve casing by movement of the said valve, and automatically actuated valves within the said tubular valve for controlling the direction of the passage of the anesthetic and gases through the opening in the said valve casing and through the said valve.

6. A surgical inhaler comprising a valve casing having means for connecting it to a face piece and also having an opening for forming the side thereof in communication between a face piece and a source of anesthetic or the like, a tubular slide valve situated in the said casing and having a plurality of openings therein any one of which is adapted to be carried into alinement with the opening in the valve casing by movement of the said valve, internal flanges in the said tubular valve, check valves adapted to be seated against the said flanges for closing openings through the same, a rod supported upon the said flanges, which rod supports the said check valves, and means extending transversely of the said tubular valve for supporting the valves in the latter when out of engagement with the said flanges.

7. A surgical inhaler comprising a tubular valve casing having an opening in one side thereof, a tubular slide valve in the said tubular casing, provided with a reduced end portion having openings through its sides to permit the passage of an anesthetic or the like into the said tubular valve from the said valve casing, the end of said slide valve being closed for the purpose stated and being provided with a plurality of openings any one of which is adapted to be carried into engagement with the opening in the valve casing, means for indicating which of the said valve openings is in alinement with the opening in the said casing, and means for controlling the passage of an anesthetic and gases through the said openings.

8. A surgical inhaler comprising a tubular valve casing provided with an opening adapted to form communication with a face piece and the said casing having at one end an opening arranged to form communication with a source of anesthetic or the like and having an open air opening near its opposite end, a tubular slide valve situated in the said casing, one end of the said valve being closed and the other end being open, the closed end of the said valve when in one position being adapted to close the first mentioned end opening, and the said valve when in its extreme opposite position closing the said open air opening through the said casing, the said valve having a reduced end portion provided with openings for the passage of an anesthetic or the like and also having a plurality of openings any one of which is adapted to be carried into alinement with the first named opening in the valve casing, and means for controlling the direction of travel of the gases through the said tubular valve.

9. A surgical inhaler comprising a tubular valve casing having an opening for communication with a face piece, and also having a longitudinal slot in one side thereof which slot is provided at its center with inclined substantially parallel surfaces forming shoulders, a tubular valve in the said casing having a plurality of openings any one of which may be carried into alinement with the opening in the valve casing by a movement of the said valve, and a finger piece extending through the said slot and having connection with the said valve, the said finger piece being adapted to be moved longitudinally in the said slot to move the said valve and the relation of the said finger piece and the said longitudinal slot to the openings in the valve and in the said valve casing being such that the position of the finger piece in the said longitudinal slot indicates the positions of the openings in the said valve with respect to the opening in the valve casing.

10. An inhaler comprising a tubular valve casing having an opening for communication with a source of anesthetic and also having an opening for communication with a face piece, for the passage of anesthetics and gases, a tubular slide valve in said casing for controlling said opening, one end of which is closed and is adapted, when the valve is in one position, to close the first named opening to prevent the passage of anesthetic into the inhaler, and a plurality of valves carried by said slide valve for the purpose described.

11. An inhaler comprising a casing having openings for communication with a face piece and with a source of anesthetic, a slide valve having a plurality of operative positions and carrying means whereby it may be shifted into different positions, and means disposed longitudinally of the casing for indicating the relative positions of the said slide valve in said casing, and for stopping said valve in selected positions intermediate of its range of longitudinal movement.

12. In mechanism of the class described, the combination with a casing inclosing a chamber having ports leading to air and separate means for connecting said chamber with an inhaling mask and with a source of anesthetic, of a member movable in said chamber for controlling the air ports and the connection with the source of anesthetic and having a plurality of ports registerable with the mask connection, and means for controlling the ports therein to direct the inhalation and exhalation through the connection with said source of anesthetic when said member is in one extreme position, to direct inhalation and exhalation through said air ports when in the other extreme position, and to direct inhalation through said anesthetic connection and exhalation through said air ports when in an intermediate position.

13. In mechanism of the class described, the combination with a casing inclosing a chamber and having separate means for connecting said chamber with an inhaling mask and with a source of anesthetic and having ports respectively leading to said anesthetic connection, mask connection, and the air, of a member movable in said chamber for controlling said ports, and having a plurality of ports registerable with the port leading to said mask connection, means for controlling the ports therein to direct the inhalation and exhalation through the anesthetic connection, when said member is in one extreme position, to direct inhalation and exhalation through said air ports when in the other extreme position, and to direct inhalation through said anesthetic conection and exhalation through said air ports when in an intermediate position, and means for moving said member, said casing providing means for positively stopping said member in positions to separately register or aline each of its ports with said mask connection.

14. In mechanism of the class described, the combination with a casing inclosing a chamber and having separate means for connecting said chamber with an inhaling mask and with a source of anesthetic and having ports respectively leading to said anesthetic connection, mask connection, and the air, of a member movable in said chamber for controlling said ports, and having a plurality of ports registerable with the port leading to said mask connection, means for controlling the ports therein to direct the inhalation and exhalation through the anesthetic connection when said member is in one extreme position, to direct inhalation and exhalation through said air port when in the other extreme position, and to direct inhalation through said anesthetic connection and exhalation through said air ports when in an intermediate position, said casing having a slot provided intermediate its ends, with suitable abutments, and a finger piece carried by said movable member and extending through said slot, coöperative to engage said abutments to hold said movable member in position to register its respective ports with said mask connection.

15. In mechanism of the class described, the combination with a casing inclosing a chamber and having separate means for connecting said chamber with an inhaling mask and with a source of anesthetic, and having ports respectively leading to the air, to the anesthetic connection, and to the mask connection, a slide-valve in said chamber operative when in one extreme position to close said anesthetic port and when in the other extreme position to close said air port, and having a plurality of ports respectively registerable with the port leading to the mask connection when in either of its extreme positions or in an intermediate position, check valves for controlling the ports in said slide-valve, and operative to direct inhalation and exhalation through the connection with the source of anesthetic when one of the valve ports is in registry with the port leading to said mask connection, to direct inhalation through said anesthetic connection and exhalation through said air port when another of said valve ports is in registry with the port leading to said mask connection, and to direct inhalation and exhalation through said air port when the other of said valve ports is in registry with the port leading to said mask connection.

16. In mechanism of the class described the combination with a casing inclosing a chamber and having separate means for connecting said chamber with an inhaling mask, and with a source of anesthetic, and having ports respectively leading to said anesthetic connection, mask connection, and the air, a slide-valve movable in said chamber and having means for closing the anesthetic port and air port when in its extreme positions respectively, said slide-valve having a passage way therethrough, check valves dividing said passage way into separate chambers respectively provided with ports registerable with the ports leading to the mask connection, one of the ports in said slide-valve being registerable with the port in the mask connection when said slide-valve is in a position to close said anesthetic port and to open said air ports, to direct inhalation and exhalation through said air port to the exclusion of said anesthetic, another of said ports in the slide-valve being registerable with the port in the mask connection when said slide-valve is in a position to close said air ports and to open said anesthetic port, to direct inhalation and exhalation through said anesthetic port, and the other of said ports in said slide-valve being registerable with the port in said mask connection when said slide-valve is in an intermediate position and the anesthetic port and air ports both open, to direct in-inhalation through said anesthetic port and exhalation through said air port.

17. In mechanism of the class described, the combination with a casing inclosing a chamber and having separate means for connecting said chamber with an inhaling mask, and with a source of anesthetic, and having ports respectively leading to said anesthetic connection, mask connection, and the air, and provided with a slot offset intermediate its ends, a slide-valve movable in said chamber and having means for controlling the anesthetic port and air port when in its extreme positions respectively, said slide valve having a passage way therethrough, check valves dividing said passage way into separate chambers respectively provided with ports registerable with the ports leading to the mask connection, one of the ports in said slide-valve being registerable with the port in the mask connection when said slide-valve is in a position to close said anesthetic port and to open said air port, to direct inhalation and exhalation through said air port to the exclusion of said anesthetic, another of the ports in said slide-valve being registerable with the port in the mask connection when the slide-valve is in a position to close said air ports and to open said anesthetic port, to direct inhalation and exhalation through said anesthetic port, and the other of the ports in said slide-valve being registerable with the port in said mask connection when said slide-valve is in an intermediate position and the anesthetic port and air ports both open, to direct inhalation through said anesthetic port and exhalation through said air port, and a finger piece carried by said slide-valve and extending through said slot, engageable with the ends thereof to register the end ports in said slide-valve with the port in said mask connection and engageable with the offset edges of said slot to hold the slide-valve in such position as to register the intermediate port therein with the port in said mask connection.

18. In mechanism of the class described, the combination with a casing having a port, and a slot provided with shoulders intermediate of its ends, a slide-valve mounted to reciprocate in said casing, and having a plurality of ports, and means on said slide-valve projecting through said slot and engageable with said shoulders and the ends of the slot to determine the operative positions of said ports.

19. In mechanism of the class described, the combination with a hollow casing having a port, and a longitudinally extended slot provided with shoulders intermediate of its ends, of a slide-valve mounted to reciprocate in said casing and having a plurality of ports arranged to be separately registered with the port in said casing, check-valves interposed between the ports in said slide-valve, and means operative to shift said slide-valve in said casing and extending through said slot and engageable with the ends of said slot and with said shoulders, to register the ports in said slide-valve with the port in said casing.

In testimony whereof, we have respectively hereunto signed our names the 30th day of January, A. D., 1913, and the 5th day of February, A. D., 1913.

ARTHUR W. BROWNE.
FREDERICK L. WALLACE.

Witnesses as to Arthur W. Browne:
  ROBERT C. ANGELL,
  ALBERT A. SIEVERS.

Witnesses as to Frederick L. Wallace:
  WILLIAM J. RUSSELL,
  CLIFTON C. HALLOWELL.